(12) United States Patent
Vieslet

(10) Patent No.: US 10,428,288 B2
(45) Date of Patent: Oct. 1, 2019

(54) PROCESS FOR CONVERTING A BIOMASS INTO AT LEAST ONE BIOCHAR

(71) Applicant: BioCarbon Industries S.àr.l., Luxembourg (LU)

(72) Inventor: Jean-Paul Vieslet, Liège (BE)

(73) Assignee: BIOCARBON INDUSTRIES S.À R.L., Luxembourg (LU)

( * ) Notice: Subject to any disclaimer, the term of this patent is extended or adjusted under 35 U.S.C. 154(b) by 0 days.

(21) Appl. No.: 15/118,449

(22) PCT Filed: Feb. 11, 2015

(86) PCT No.: PCT/EP2015/052866
§ 371 (c)(1),
(2) Date: Aug. 11, 2016

(87) PCT Pub. No.: WO2015/121299
PCT Pub. Date: Aug. 20, 2015

(65) Prior Publication Data
US 2017/0183588 A1   Jun. 29, 2017

(30) Foreign Application Priority Data
Feb. 11, 2014 (FR) ..................... 14/51052

(51) Int. Cl.
*C10L 5/44* (2006.01)
*C10L 9/08* (2006.01)

(52) U.S. Cl.
CPC .............. *C10L 5/447* (2013.01); *C10L 5/442* (2013.01); *C10L 5/445* (2013.01); *C10L 9/08* (2013.01); *C10L 2290/02* (2013.01); *C10L 2290/08* (2013.01); *C10L 2290/28* (2013.01); *Y02E 50/10* (2013.01); *Y02E 50/14* (2013.01); *Y02E 50/30* (2013.01)

(58) Field of Classification Search
CPC combination set(s) only.
See application file for complete search history.

(56) References Cited

U.S. PATENT DOCUMENTS 4,816,572 A * 3/1989 Bourgeois ............... C08H 8/00
  162/23
2009/0250331 A1* 10/2009 Hopkins ............... C10B 47/44
  201/6
2011/0041392 A1* 2/2011 Stromberg ............. C10L 5/363
  44/607
2011/0179701 A1   7/2011 Grassi
2013/0104450 A1* 5/2013 Dodson .................. C10B 49/08
  44/590

FOREIGN PATENT DOCUMENTS

| EP | 2287278 A2 | 2/2011 |
| FR | 2591611 A1 | 6/1987 |
| GB | 2479924 A | 11/2011 |
| WO | 2012158112 A2 | 11/2012 |
| WO | 2013003615 A2 | 1/2013 |

OTHER PUBLICATIONS

International Search Report dated Mar. 10, 2015 re: Application No. PCT/EP2015/052866; pp. 1-3; citing: EP 2 287 278 A2, WO 2012/158112 A2, US 2011/179701 A1, US 2012/042567 A1, FR 2 591 611 A1 and GB 2 479 924 A.
Janewit Wannapeera et al. "Upgrading of woody biomass by torrefaction under pressure", Journal of Analytical and Applied Pyrolysis, 2012, vol. 96, pp. 173-180.

* cited by examiner

*Primary Examiner* — Ellen M McAvoy
*Assistant Examiner* — Chantel L Graham
(74) *Attorney, Agent, or Firm* — Cantor Colburn LLP

(57) ABSTRACT

The invention concerns a method for transforming a biomass into at least one biochar, comprising the following steps of:
(a) Providing a ground and dried biomass, said biomass containing at least 30% of a lignocellulosic biomass, by mass relative to the dry weight of the ground and dried biomass;
(b) Heating progressively this biomass to a temperature higher than 140° C. and lower than 350° C., in an oxygen-free gas stream, under a pressure comprised between 1 and 40 bar;
(c) Allowing the reaction to proceed by maintaining the temperature in the 300-700° C. range and the pressure in the 1-40 bar range;
(d) Cooling the biomass derived from step (c), at a temperature of at most 100° C., in an oxygen-free gas stream; and
(e) Collecting the biochar.

The invention also concerns the thus obtained biochar.

20 Claims, No Drawings

US 10,428,288 B2

PROCESS FOR CONVERTING A BIOMASS INTO AT LEAST ONE BIOCHAR

TECHNICAL FIELD

The present invention concerns a method for transforming a biomass, into at least one biochar.

BACKGROUND

By biochar, it is meant according to the invention, a stable carbon-rich solid derived from a heat treatment of a biomass suitable for numerous industrial applications. Thus, it constitutes, but is not limited to, a combustible with a high calorific value, representing a new alternative in the field of renewable energies. It also constitutes a fertilizer for agricultural use for soil amendment. It also constitutes a product intended for the chemical industry, for example as a catalyst. It is further an excellent adsorber and constitutes a purifier, a decolorant, a decontaminant and/or a deodorant, usable in numerous industrial fields. It may be shaped in any format depending on its destination, such as a powder, grains . . .

The method of the invention is described more specifically with reference to a lignocellulosic biomass, but by analogy, it may be applied to other biomasses.

Methods for transforming a lignocellulosic biomass into combustibles are already known involving in particular a torrefaction step. The torrefaction of a biomass consists in heating it gradually to a moderate temperature, generally between 190° C. and 250° C., in an oxygen-free atmosphere, and possibly under pressure. This treatment results in an almost complete elimination of water from the biomass and in a partial modification of its molecular structure, causing a change of some of its properties. In particular, this heat treatment produces a depolymerization of hemicellulose, making the torrefied biomass almost hydrophobic and friable, while improving its calorific value.

Thus, the document EP2287278A2 describes a method for torrefying a lignocellulosic biomass comprising a step of drying the biomass so as to remove about 95% of moisture, then a torrefaction step in a reactor brought to a temperature of 100-1000° C. in theory, 220-300° C. in practice, at a pressure of 1-50 bar, preferably 5-20 bar, in an oxygen-free atmosphere, and finally a step of cooling the torrefied biomass, this method providing for a gas recycling system.

There is also known according to the document WO2013/003615A2, a device for torrefying a hemicellulose-rich biomass such as wood, and a method for treating this biomass implemented in this device, comprising a biomass drying step, a torrefaction step carried out at a temperature of 200-250° C., at a pressure of at least 3 bar, in an inert atmosphere, and a cooling step. The device is constituted by a vertical body in which is disposed a superposition of plates constituting treatment compartments of the biomass. These compartments are equipped with apertures for allowing the biomass, being treated or already treated, to flow and the treatment gases or products may be evacuated via pipes in order to be recycled.

According to the article J. Wannapeera and N. Worasuwannarak, Journal of Analytical and Applied Pyrolysis 96 (2012) 173-180, the authors have studied, on a laboratory scale, namely on a few grams, the effect of pressure in a method for transforming, by torrefaction, a biomass based on *Leucaena leucocephala*, a tropical tree. This method comprises the following steps:

The biomass is shredded then ground into particles of a size <75 μm;

The particles are dried afterwards in a vacuum oven at 70° C. for 24 h;

The particles are placed in a reactor under inert atmosphere, which is then introduced and maintained in a furnace at a temperature of 200-250° C. and a pressure of 1-40 bar, for 30 min;

After these 30 min, the reactor is immersed in water in order to stop the reaction;

The product derived from this carbonization is dried in an oven for 2-3 h then analyzed.

The highest values of the higher calorific value (HCV) are obtained for a solid derived from a torrefaction at a temperature in the order of 250° C. and a pressure of 40 bar. These works have highlighted the favorable effect of pressure on torrefaction reactions in these conditions.

Known torrefaction treatments under pressure such as those described before produce solids having a high lower calorific value (LCV), generally in the order of 19 to 23 MJ/kg. The LCV of a solid obtained according to the method described in EP2287278A2 is actually in this order. The authors state herein that their torrefaction method would result in a mass reduction of 30% with a loss of 10% of the overall energy, which means that the energy of the obtained solid, corresponding to 90% of the energy of the initial dried biomass, is concentrated in 70% of the mass of the initial dried biomass, which leads to a concentration of the LCV per unit mass of 0.9/0.7, namely 1.28. The reported biomass drying ratio being 5%, equivalent to that of a commercial wood granulate whose LCV is in the order of 15 to 18 MJ/kg, the LCV of the obtained solid according to EP2287278A2 is in the order of 19 to 23 MJ/kg. Besides, these values are those reported by numerous developers in this field.

However, there is still a growing need to develop methods which are more effective and less energy-consuming, with investments which are less expensive, easier to control and which allow to obtain a combustible with a better quality.

The authors of the present invention have discovered that the implementation of a torrefaction in specific conditions allows initiating a spontaneous exothermic phenomenon, producing a combustible solid whose LCV is very high, much higher than that of combustibles resulting from the transformation methods discussed before. Moreover, this combustible solid has a very high carbon content, generally higher than 80% by mass and a reduced oxygen content, in the order of 10% by mass or less. The authors have also observed that this phenomenon would occur with numerous types of biomass.

This exothermic phenomenon is prevented in known methods because it is considered as an unfavorable factor in the energy balance. The authors of the invention have actually demonstrated that it is the development of this phenomenon which allows producing a biochar which is more carbon-rich, and therefore more calorific.

Two conditions are essential so that this phenomenon occurs. They lie in an accurate control of the grain-size distribution of the involved biomass and in the drying of the latter before the torrefaction step, this drying having to be complete. Hence, the prior drying step has to retrieve all moisture from the biomass, in order to reach a moisture content close to 0, and always lower than 10% by mass. The more the treated biomass is close to the anhydrous condition, the more the method is effective.

BRIEF SUMMARY

Thus, the invention concerns a method for transforming a biomass into at least one biochar, comprising the following steps of:

(a) Providing a ground and dried biomass, said biomass containing at least 30% of a lignocellulosic biomass, by mass relative to the dry mass of said ground and dried biomass;

(b) Heating progressively this biomass at a temperature higher than 140° C. and lower than 350° C., in an oxygen-free inert gas stream, at a pressure comprised between 1 and 40 bar;

(c) Allowing the reaction to proceed by maintaining the temperature in the 300-700° C. range and the pressure in the 1-40 bar range, And optionally, (d) Cooling the biomass derived from step (c) at a temperature of at most 100° C. in an oxygen-free inert gas stream, and (e) Collecting the biochar.

This method allows obtaining a solid presenting characteristics which in particular make it an effective combustible, whose carbon concentration is higher than 85% by mass and whose LCV is comprised between 25 and 35 MJ/kg, from a wood whose carbon concentration is in the order of 45% by mass, whose oxygen concentration is in the order of 45% by mass and whose LCV is in the order of 17 MJ/kg. This method also leads to a very considerable reduction of the oxygen content, which reaches values in the order of 10% by mass, resulting in an equivalent reduction of the overall mass of the combustible product.

By transformation of a biomass into at least one biochar, it is meant according to the invention, that one or more combustible gas(es) is/are co-produced. They may be injected at step (b) of the method, and also be used to supply any other thermal or chemical installation.

The step (b) of the method brings the matter to a temperature at least higher than the water boiling temperature at the working pressure, the moisture content of the matter treated in the subsequent steps is therefore almost zero, and preferably zero.

Prior to disclosing the invention in more detail, some terms used within the text are defined hereinafter and the methods for analyzing the different measured parameters are given hereinafter.

By lignocellulosic biomass, it is meant according to the invention, organic matters essentially of vegetable origin comprising at least one constituent selected among hemicellulose, cellulose, lignin, carbonhydrates and oligosaccharides. As example, a biomass according to the invention is selected among or derived from products and by-products of forestry, agricultural and agri-food activities.

Unless otherwise stated, the indicated temperatures are the core temperatures of the treated biomass.

The moisture content of the biomass represents its water content; it is expressed as a percentage by mass of water relative to the mass of the raw biomass. Several methods allow measuring it, the one retained by the authors of the present invention is the Karl-Fisher method, well known from those skilled in the art. A ground biomass sample is maintained for 24 hours in dehydrated methanol under stirring then the moisture content is determined by means of the Metrohm 870KF Trinito plus volumetric titration apparatus.

In the context of this method, essential characteristics of a biochar, for example when it is used as a combustible product, are its moisture content, its lower calorific value (LCV), its ash content and its elemental composition (ultimate analysis).

Its moisture content is measured by means of the above-described method.

The calorific value of a combustible represents the amount of energy contained in a unit mass of the combustible. The lower calorific value (LCV) and the higher calorific value (HCV) are distinguished. They comply with the definitions and are measured, in accordance with the ISO 1928 standard.

The HCV is measured in an IKA C 5000 combustion calorimeter.

Afterwards, the LCV is calculated from an elemental composition of the biomass. An elemental analysis of this biomass is carried out in a FISONS EA 1108 apparatus.

The ash content of the combustible is obtained by incinerating the ground sample. Heating is carried out by steps up to 815° C. and maintained at this temperature until obtaining ashes which are weighted afterwards. The ash content is expressed as a mass percentage relative to the mass of the sample.

As said before, the authors have observed that the physical state of the biomass subjected to the heating step (b) is important in order to reach the performances of the method of the invention. They have further observed that it is preferable to supply the method with a matter presenting a low grain-size dispersion. Hence, the biomass has to be ground beforehand and is advantageously in the form of particles with various shapes, but with homogenous dimensions. Thus, the particles derived from this grinding operation may be in the form of grains, chips, sticks, needles and/or any other aspect. Regardless of their shapes, it is important that the dimensions of the particles are substantially homogenous. By particles with homogenous dimensions, it is meant that at least 50%, preferably at least 60%, even better, at least 70% by weight and more, of the particles, relative to the dried mass, are constituted of particles whose smallest dimension is of at least 0.5 mm. This smallest dimension corresponds to the thickness. Preferably, the largest dimension of said particles whose smallest dimension is of at least 0.5 mm, is of at most 40 mm. For illustration, the particles may be in the form of grains whose dimensions vary from 0.5-5 mm, chips or needles with a thickness of 0.5-3 mm and a length of at most 40 mm, still better with a length of 10-25 mm. It is preferable that the particles are as homogenous as possible, in terms of dimensions as said before, but also in terms of shape. Thus, we will opt for a grinding which produces a matter being mainly in the form of grains and of which preferably at least 50% of the mass relative to the mass of the dry biomass have a size varying from 0.5-4 mm. In another variant, we will select a grinding which produces a matter being mainly in the form of chips and/or needles and of which preferably at least 50% by mass relative to the mass of the dry biomass have a thickness of at least 0.5 mm and a length of at most 40 mm; advantageously the matter in the form of chips and/or needles of which at least 50% have a thickness varying from 0.5-3 mm and/or a length of 10-25 mm.

A too high proportion of fine particles results in a considerable production of tars which might be prejudicial to the effectiveness of the method. A too high proportion of large particles weakens the efficiency of the method in that these particles cannot be converted effectively into biochar.

DETAILED DESCRIPTION

The method of the invention responds advantageously to the characteristics described hereinafter, considered individually or in combination. They contribute to an increase of the effectiveness of the method.

Step (b) may be carried out in two steps, one step (b1) according to which the biomass is preheated at a temperature of at least 120° C., preferably of at least 130° C. and, even better, of at least 140° C., and one step (b2) according to which the biomass preheated at step (b1) is heated at a temperature of at least 220° C., preferably 230° C., and even of at least 240° C.

At step (b1), preferably, the temperature is set between 180 and 220° C. and/or the pressure is set between 3 and 14 bar.

At step (b2), preferably, the temperature is set between 240 and 300° C. and/or the pressure is set between 3 and 14 bar.

The steps (b1) and (b2) may partially overlap.

At the end of step (b), the solid is in the conditions of an initiation of a spontaneous carbonization reaction. At step (c), the temperature is controlled so as to be maintained between 300 and 700° C., preferably, it is maintained between 350 and 500° C., even better between 350 and 400° C.

The method of the invention may be conducted in batch or continuously. In batch, steps (b) and (c) are carried out in the same enclosure. Preferably, the method is implemented continuously, the steps (b) or (b1) and (b2), (c), and (d) being performed in at least two different compartments. According to one variant of the method of the invention, the steps (b) or (b1) and (b2), (c), and (d) are carried out in different compartments, respectively, a first, and possibly a second, a third and a fourth compartments. A priori, this variant is more effective and economical, in particular it allows recovering the heat of the gases produced at steps (b) and (c), and possibly recycling them, upstream of the method. In addition, it allows a more regular operation of the installations where the method is implemented with a more constant regulation. Alternatively, steps (b) and (c) may be performed in the same compartment. Also, step (b) may be carried out inside a boiler of an electrical and/or heat generation unit.

Advantageously, the different compartments are equipped with the following means:

The first compartment, for implementing step (b1), is equipped with convective and/or fluidized-bed preheating means and with temperature control means; preferably, the heat transfer is performed by convection.

The second compartment, for implementing step (b2), is equipped with convective, conductive and/or radiating heating means and with temperature control means; preferably, the heat transfer is performed by radiation.

The third compartment, for implementing step (c), is equipped with temperature and pressure control means. In particular, all useful temperature control means are eligible to balance the amount of heat produced by the reactions with the thermal load.

The fourth compartment, for implementing step (d), is equipped with convective and/or conductive cooling means.

As indicated before, in a continuous implementation of the method, the gases are recycled; thus the heat emitted by the exothermic phenomenon at step (c) in the third compartment is recovered and recycled in either one of the first and second compartments and/or for drying the necessary biomass at step (a). It is also possible to provide for a circulation of the gases generated by steps (b2) and (c) countercurrentwise to the matter.

In such a variant, the method may be implemented without any supply of external inert gas. Thus, it is possible to consider it as fully autonomous in terms of energy, from the upstream steps, including the treatment of the fresh biomass, till the downstream steps, including the shaping of the combustible solid and, in this case, a cogeneration unit will be preferably installed.

In the method of the invention, at step d), the treatment time varies in the range from 50 seconds to 3 minutes. Hence, the short reaction times are another advantage of the method of the invention.

The method of the invention applies to the transformation of any biomass. Preferably, the biomass is lignocellulosic. In particular, it is intended to the conversion of any lignocellulosic biomass derived from products and by-products of forestry, agricultural and agri-food activities.

The invention also concerns the biochar which can be obtained by the method defined hereinabove. In particular, it presents a lower calorific value (LCV) of at least 25 MJ/kg, preferably of at least 30 MJ/kg, which may reach 35 MJ/kg and in this, it constitutes a very calorific combustible.

The invention is illustrated hereinafter by examples of treatment of biomasses of various origins, by a batch transformation method.

Prior to step c), that is to say at the inlet of the reactor, all examples are carried out in the following conditions.

10 to 15 kg of biomass, ground and dried, are loaded in an AISI 310S type stainless steel tube, with a 200 mm diameter and 1800 mm height. The tube is filled with nitrogen and its inertization (complete absence of oxygen) is controlled. Afterwards, a gaseous nitrogen current, preheated at a temperature of about 200° C., is passed in order to completely dry the matters, which is checked on the one hand by a measurement of temperature within the matter, which, in all cases, should be higher than the boiling temperature of water, and on the other hand, by a measurement of the composition of the gas. The drying time varies from 1 h to 1 h30, it allows reaching a moisture content of 0.

Finally, the reactor is placed under a nitrogen pressure and the progressive heating of the walls of the reactor is started, which initiates the reactive transformation.

Example 1: Method for Transforming Softwood Sawdust and Shavings According to the Invention—Pressure 40 bar Shavings coming from a framework manufacture, at least 70 to 80% of which are in the form of needles with a 1 mm thickness and 20 mm length, and fine softwood sawdust with a particle-size distribution of 0.2-0.5 mm are subjected to the preparation protocol hereinabove.

Afterwards, the resistances of the reactor are brought progressively to a temperature of 250° C., then 270° C. At 160° C., a slight overall exothermicity is observed, and the exothermic phenomenon takes off from 270° C. causing a spontaneous rise of temperature up to 700° C.

Afterwards, the product is cooled at a temperature lower than 100° C.; about 30 minutes are necessary.

The product derived from this transformation resembles to a very porous and very friable carbon foam. These characteristics are as follows:

The obtained average LCV is of 32.5 MJ/kg, locally reaching 35 MJ/kg. The variation of the LCV that can be observed results from the batch implementation of the method.

The obtained overall energy efficiency is of 84.8%, 20% of which are in the gas stream and 80% in the solid stream. The obtained mass yield to the anhydrous mass is of 46.2%.

Example 2: Method for Transforming Softwood Sawdust and Shavings According to the Invention—Pressure 10 Bar Shavings coming from a framework manufacture, at least 70 to 80% of which are in the form of needles with a 1 mm thickness and 20 mm length, and fine softwood sawdust with a particle-size distribution of 0.2-0.5 mm are subjected to the preparation protocol hereinabove.

Afterwards, the resistances of the reactor are brought progressively to a temperature of 250° C., then 270° C. At 160° C., a slight overall exothermicity is observed, then the exothermic phenomenon takes off from 270° C. causing a rise of temperature up to 400° C.

Afterwards, the product is cooled at a temperature lower than 100° C.; about 30 minutes are necessary.

The thus obtained characteristics of the combustible product are as follows:

The obtained average LCV is of 32.5 MJ/kg, locally reaching 34.7 MJ/kg.

The obtained overall energy efficiency is of 86.5% and the obtained mass yield to the anhydrous mass is of 51.6%.

Example 3: Method for Transforming Hardwood Sawdust—Pressure 5 Bar

Hardwood sawdust, namely a 80/20 mixture of beech and oak, coming from a stairs and doors manufacture, with a particle-size distribution of 0.1-0.8 mm, are subjected to the preparation protocol hereinabove.

Afterwards, the resistances of the reactor are brought progressively to a temperature of 250° C., then 280° C. At 280° C., a very marked spontaneous exothermic reaction is observed. The reaction brings the temperature to 510° C.

Afterwards, the product is cooled at a temperature lower than 100° C.; about 30 minutes are necessary.

The thus obtained characteristics of the combustible product are as follows:

The obtained average LCV is of 33.1 MJ/kg, locally reaching 33.7 MJ/kg.

Through this transformation, an overall energy efficiency of 77.0% and a mass yield to the anhydrous mass of 43.3%, are obtained.

The authors have observed a considerable production of tars induced by a significant presence of fine particle-size matter.

Example 4: Method for Transforming <<Run-of-Mine>> Fresh Matters—Pressure 10 Bar A fresh biomass, essentially constituted by birch freshly cut and shredded with leaves, twigs and barks, is dried in open air, then ground and dried. Its average thickness is in the order of 15 mm, with a 25 mm length. It is subjected to the preparation protocol hereinabove.

Afterwards, the resistances of the reactor are brought progressively to a temperature of 250° C., then 270° C. The exothermic phenomenon takes off from 270° C., causing a rise of temperature up to 500° C.

Afterwards, the product is cooled at a temperature lower than 100° C.; about 30 minutes are necessary.

The thus obtained characteristics of the combustible product are as follows:

The obtained average LCV is of 30.5 MJ/kg, locally reaching 31.1 MJ/kg.

Through this transformation, an overall energy efficiency of 65.3% and a mass yield to the anhydrous mass of 42.1%, are obtained.

In conclusion, while all torrefaction technologies, such as the one constituting the object of the document EP 287278A2, disclose the obtained following results for a wood with 95% of dry matter and a LCV of 17 MJ/kg: a mass reduction of 30%, an obtained LCV of 21 MJ/kg and an energy concentration factor per unit of overall mass of 1.28, the method of the invention shows a mass reduction of 55%, an obtained LCV of at least 30 MJ/kg, which provides an energy concentration per unit of overall mass of 1.76.

The invention claimed is:

1. A method for transforming a biomass into at least one biochar, comprising the following steps of:
   (a) providing a ground and dried biomass, said biomass containing at least 30% of a lignocellulosic biomass, by mass relative to the dry weight of the ground and dried biomass and said biomass being in the form of particles with homogeneous dimensions and having a moisture content close to 0;
   (b) heating progressively this biomass at a temperature higher than 140° C. and lower than 350° C., in an oxygen-free gas stream, at a pressure comprised between 1 and 40 bar until exothermic phenomenon takes off;
   (c) allowing the exothermic reaction to proceed by maintaining the temperature in the 300-700° C. range and the pressure in the 1-40 bar range;
   (d) cooling the biomass derived from step (c), at a temperature of at most 100° C., in an oxygen-free gas stream; and
   (e) collecting the biochar,
   said method being implemented without any supply of external inert gas.

2. The method according to claim 1, wherein a combustible gas is obtained as a co-product.

3. The method according to claim 1, wherein step (b) is carried out in two substeps, one step (b1) according to which the biomass is preheated at a temperature higher than 120° C. and one step (b2) according to which the biomass preheated at step (b1) is heated at a temperature higher than 220° C.

4. The method according to claim 3, wherein step (b1) is carried out at a temperature set between 180 and 220° C.

5. The method according to claim 3, wherein step (b2) is carried out at a temperature set between 240 and 300° C.

6. The method according to claim 1, wherein step (b) is carried out at a pressure varying from 3 to 14 bar.

7. The method according to claim 1, wherein at step (c), the temperature is maintained between 350 and 500° C.

8. The method according to claim 1, wherein the steps (b) or (b1) and (b2), (c) and (d) are performed in at least two different compartments and the method is continuous.

9. The method according to claim 8, wherein step (b1) is performed in a first compartment, said first compartment being equipped with convective and/or fluidized-bed preheating means.

10. The method according to claim 9, wherein step (b2) is performed in a second compartment, said second compartment being equipped with radiating heating means.

11. The method according to claim 10, wherein step (c) is performed in a third compartment, said compartment being equipped with temperature and pressure control means.

12. The method according to claim 11, wherein step (d) is performed in a fourth compartment, said compartment being equipped with convective and/or conductive cooling means.

13. The method according to claim 11, wherein the heat emitted by the reaction at step (c) in the third compartment is recovered and recycled in either one of the first and second compartments and/or for drying the necessary biomass at step (a).

14. The method according to claim 1, wherein the gases generated at steps (b) and (c) are recirculated upstream of the method, countercurrentwise to the matter.

15. The method according to claim 1, wherein the biomass is a lignocellulosic biomass comprising at least one constituent selected among hemicellulose, cellulose, lignin, carbohydrates, and oligosaccharides.

16. The method according to claim 1, wherein step (b) is carried out inside a boiler of an electrical and/or heat generation unit.

17. A biochar obtainable by the method according to claim 1, said biochar having a carbon content higher than 80% by mass and an oxygen content of 10% by mass or less.

18. The biochar according to claim 17 wherein it presents a lower calorific value (LCV) of at least 30 MJ/kg.

19. The method according to claim 1, characterized in that the ground biomass is in the form of particles of which at least 50% by weight relative the dry mass are constituted of particles whose smallest dimension is of at least 0.5 mm.

20. The method according to claim 19, characterized in that the ground biomass is in the form of particles of which at least 50% by weight relative to the dry mass are constituted of particles whose smallest dimension is of at least 0.5 mm and whose largest dimension is of at most 40 mm.

* * * * *